United States Patent [19]

Karklins et al.

[11] Patent Number: 5,012,977
[45] Date of Patent: May 7, 1991

[54] VEHICLE WINDOW WASHER WITH WASHER FLUID TEMPERATURE RESPONSIVE PRESSURE CONTROL

[75] Inventors: Elgin J. Karklins, Kettering, Ohio; Stephen J. Scroggie, El Paso, Tex.; Steven L. Tracht, Springboro; Mark W. Striker, West Carrollton, both of Ohio

[73] Assignee: General Motors Corporation, Detroit, Mich.

[21] Appl. No.: 408,869

[22] Filed: Sep. 18, 1989

[51] Int. Cl.$^5$ ............................................. B05B 1/10
[52] U.S. Cl. ................................. 239/284.1; 239/75; 15/250.01
[58] Field of Search ........... 15/250.01, 250.02, 250.03, 15/250.04, 250.05, 250.06, 250.07, 250.08, 250.09; 239/284.1, 284.2, 75

[56] References Cited

U.S. PATENT DOCUMENTS

| | | |
|---|---|---|
| 3,243,119 | 3/1966 | Merkle . |
| 3,286,932 | 11/1966 | Kibler . |
| 3,591,887 | 7/1971 | Keddle . |
| 4,090,668 | 5/1978 | Kochenour ..................... 239/284.1 |
| 4,331,295 | 5/1982 | Warihashi ..................... 239/284.1 |
| 4,508,957 | 4/1985 | Rochitelli ..................... 239/284.1 |
| 4,768,716 | 9/1988 | Buchanan, Jr. et al. . |
| 4,838,488 | 6/1989 | Heier et al. ..................... 239/284.1 |
| 4,877,186 | 10/1989 | Scholl ..................... 239/284.1 |

FOREIGN PATENT DOCUMENTS

| | | | |
|---|---|---|---|
| 2434492 | 1/1976 | Fed. Rep. of Germany ... | 239/284.2 |
| 1460494 | 10/1966 | France ..................... | 239/284.1 |

OTHER PUBLICATIONS

1988 Firebird Service Manual, pp. 8E-1, 8E-2, 8E-11.

Primary Examiner—Andres Kashnikow
Assistant Examiner—Christopher G. Trainor
Attorney, Agent, or Firm—Robert M. Sigler

[57] ABSTRACT

A vehicle window washer in which the pump outlet pressure is varied in an inverse manner with temperature of the washer fluid so as to maintain a more consistent fluid deposit on the window as fluid viscosity changes with temperature. In particular, it uses a motor driven pump which provides a higher pump outlet pressure with the motor driven in a first direction than with the motor driven in the opposite direction and switches activation of the motor between the two directions based on sensed temperature of the fluid in the washer fluid reservoir.

8 Claims, 1 Drawing Sheet

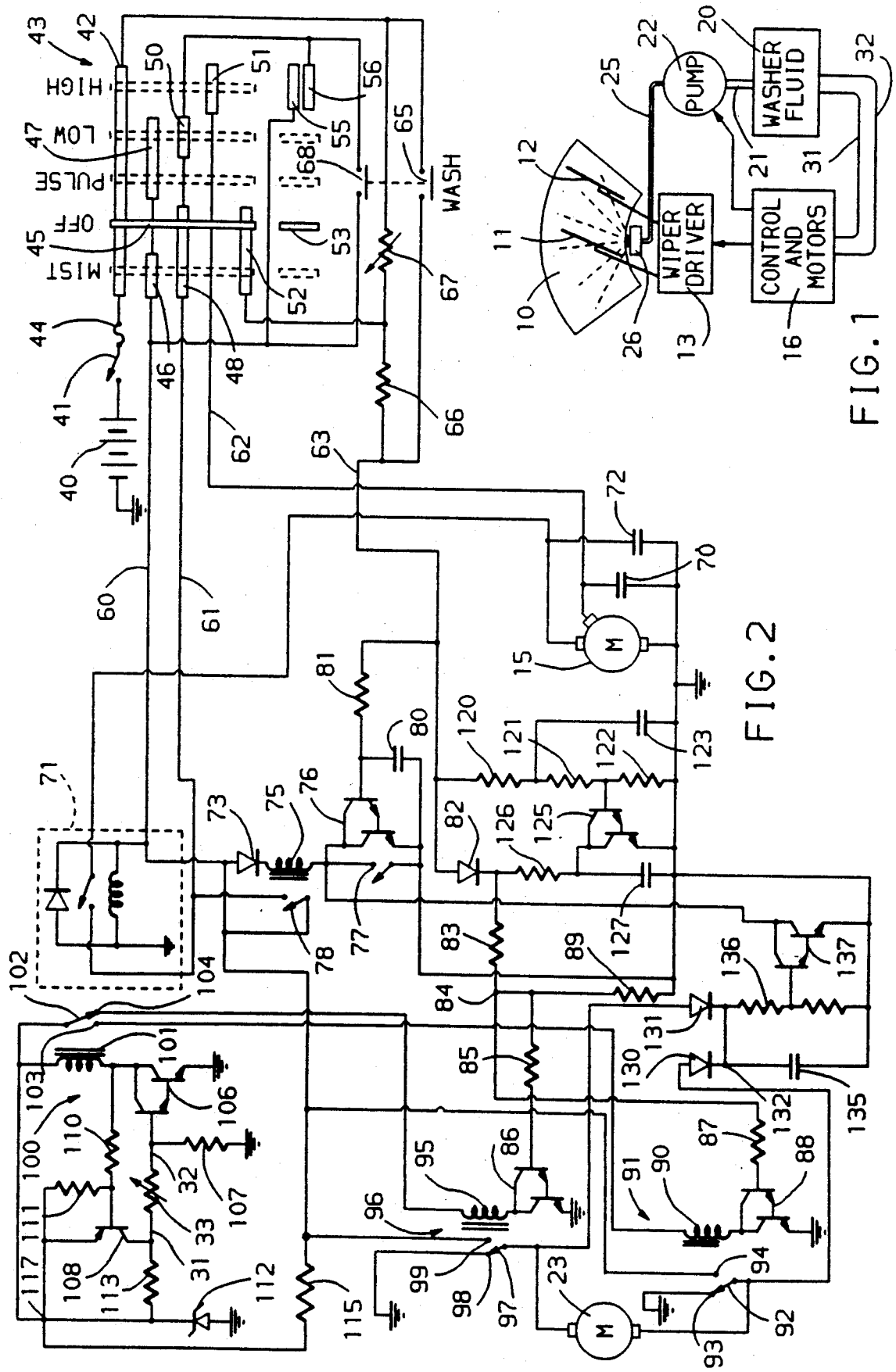

VEHICLE WINDOW WASHER WITH WASHER FLUID TEMPERATURE RESPONSIVE PRESSURE CONTROL

BACKGROUND OF THE INVENTION

This invention relates to a window washer for a motor vehicle adapted to deposit a window washer fluid in a consistent position on a vehicle window regardless of washer fluid temperature. The vehicle window washer system is of the type in which the washer fluid is sprayed onto the window through a nozzle by a motor driven pump; and the spray or projection characteristics of the washer fluid are partially determined by the fluid's viscosity, which varies with ambient temperature. Since the washer fluid is projected by the nozzle through the air at the window and the fluid, while in the air, is affected by gravity, air currents and other environmental factors, the speed at which the individual droplets of washer fluid leave the nozzle partially determines the points at which they hit the window. The speed of the washer fluid droplets is determined by the fluid pressure at the nozzle and the viscosity of the fluid. With a substantially constant pump outlet pressure, there can be a significant difference in the deposit position or pattern on the window over the temperature range typical of motor vehicle operation.

The known prior art in the field of vehicle window washer and wiper systems does not deal directly with this problem. Kibler U.S. Pat. No. 3,286,932 discloses a "winter-summer" windshield washer system in which a valve is operable by the vehicle operator to select between two fluid supplies, one comprising a tank of washer liquid pumped by an electric motor for normal windshield cleaning and the other comprising a tank of alcohol/water pumped by compressed carbon dioxide for winter cleaning or removal of bugs, etc. However, this prior art does not discuss or propose apparatus which automatically corrects for temperature induced variations in the viscosity of the washer fluid. Another prior art publication, Keddle U.S. Pat. No. 3,591,887, shows a windshield washer with a pump fed through a selector valve to select hot or cold fluid for normal or defrosting applications; but this disclosure also does not show viscosity correction of the washer fluid. Temperature controls of washer fluid are also known, as in Merkle U.S. Pat. No. 3,243,119 and Rocchitelli U.S. Pat. No. 4,508,957; but these require additional fluid heating and piping apparatus.

SUMMARY OF THE INVENTION

This invention is a vehicle window washer in which the pump outlet pressure is varied in an inverse manner with temperature of the washer fluid so as to maintain a more consistent fluid deposit on the window with temperature changes. In particular, it uses a motor driven pump which provides a higher pump outlet pressure with the motor driven in a first direction than with the motor driven in the opposite direction and switches activation of the motor between the two directions based on sensed temperature of the fluid in the washer fluid reservoir. Since there already exist standard motor driven washer pumps with the characteristic of greater pump outlet pressure with activation in one direction than the other direction, the invention may be obtained with changes only to the electrical control, without changes to the pump unit itself, the addition of heating apparatus, or the rerouting of fluid conduits.

SUMMARY OF THE DRAWINGS

FIG. 1 is a schematic diagram of a vehicle window cleaning apparatus including a window washer system according to the invention.

FIG. 2 is an electric circuit diagram of a control for the apparatus of FIG. 1.

DESCRIPTION OF A PREFERRED EMBODIMENT

Wiper Circuit and Operation

Referring to FIG. 1, A vehicle is provided with a window such as windshield 10 having a pair of wipers 11, 12 drivable across window 10 by a wiper driver mechanism 13 through a repeating wipe pattern. Wiper driver mechanism 13 is of a standard type which converts the rotating motion of an input shaft to a reciprocating motion of wipers 11, 12; and the input shaft thereof is driven by a wiper motor 15 which is part of a control and motor apparatus 16 shown in more detail in FIG. 2 and which will be described below. Continuing with FIG. 1, a washer fluid reservoir 20 is connected by a first conduit 21 to the inlet of a motor driven pump 22 with an asymmetrical outlet pressure for forward and reverse activation, with the motor 23 of motor driven pump 22 also shown in control and motor apparatus 16 of FIG. 2. Continuing again with FIG. 1, the outlet of pump 22 is connected through a second conduit 25 to a nozzle or nozzles 26 directed at windshield 10 so as to spray washer fluid thereon when pump 22 is activated. A temperature sensor, in the form of a negative temperature coefficient (NTC) thermistor 33, is contained within reservoir 20 so as to be immersed in the washer fluid contained therein. NTC thermistor 33 is connected in the circuit of control and motor apparatus 16 by leads 31, 32 and is shown in FIG. 2. Alternatively, thermistor 33 could be placed in a different location in direct contact with the washer fluid, such as within pump 22, conduit 25 or nozzle 26. In other embodiments, thermistor 33 or another temperature sensing device could be placed elsewhere in the vicinity of the washer fluid to approximate the temperature thereof. In some embodiments, thermistor 33 and its accompanying circuit to be described below could be replaced by temperature sensing apparatus effective to generate a signal of engine coolant or some other engine compartment related temperature, when reservoir 20 is located in the engine compartment; and cost savings may be realized if this temperature sensing apparatus already exists and provides an easily available signal. However, the sensor in direct contact with the washer fluid will be the most accurate sensor of washer fluid temperature.

Referring to FIG. 2, an electric power source comprising the standard vehicle alternator, voltage regulator and battery but shown only as battery 40 has a ground terminal and further has a high voltage terminal at 12–14 volts connected through an ignition switch 41 and fuse 44 to a stationary contact 42 of a well known wiper activation switch apparatus 43. A movable contact 45 of switch apparatus 43 may be moved to MIST, OFF, PULSE, LOW and HIGH positions to select similarly named modes of wiper activation and contacts stationary contact 42 in all positions. Stationary contacts 46 (MIST) and 47 (PULSE, LOW) lie parallel to stationary contact 42 and in line and electrical connection with each other so as to be connected to stationary contact 42 by movable contact 45 in the positions indicated in parentheses for each. Stationary contacts 48 (MIST, OFF) and 50 (LOW) likewise form another electrically connected parallel line for connection to stationary terminal 42 by movable contact 45 in the indicated positions. Similarly, stationary contact 51 is contacted by movable contact 45 in the latter's HIGH position; and stationary contact 52 is contacted by movable contact 45 in the latter's MIST and OFF positions. The movable member, not shown, that carries movable contact 45 also carries a separate movable contact 53, insulated from contact 45, which connects stationary contacts 55 and 56 to each other in its HIGH position. Stationary contacts 55 and 56 are connected to stationary contacts 46 and 50, respectively. Stationary contacts 46, 48 and 51 are connected to switch outlet lines 60, 61 and 62, respectively. A fourth switch outlet line 63 is connected through a momentary contact WASH switch 65 to stationary contact 42 and through a resistor 66 (24K) to stationary contact 52. Stationary contact 52 is further connected through a variable resistor 67 (1.5M pot) to stationary contact 42; and stationary contact 50 is further connected through another momentary contact switch 68, ganged to WASH switch 65 for common activation, to stationary contact 46. The four switch outlet lines 60-63 (and the battery connection line to the ignition switch) are the only communication required between the operator controlled switch apparatus 43 and the rest of the control circuit shown in FIG. 2. This arrangement has been produced and sold as part of a depressed park wiper/washer circuit as shown, for example, in the 1988 Pontiac Firebird Service Manual, section 8E.

For the HIGH speed mode of wiper operation, line 62 connects to the high speed brush of motor 15, which is a standard, three brush, permanent magnet wiper motor with a grounded common brush. Thus, with movable contact in its HIGH position, motor 15 will be driven at high speed directly through switch apparatus 43. A capacitor 70 is connected across the high and common brushes of motor 15 for electrical noise suppression.

For the LOW speed mode of wiper operation, the low speed brush of motor 15 is connected through the contacts of a park relay 71 to line 61, with a noise suppression capacitor 72 connected across the low and common brushes of motor 15. The activating coil of relay 71 is connected from line 60 to ground, so that relay 71 is activated in the MIST, PULSE and LOW positions of switch apparatus 43. Park relay 71 is a special electromechanical device well known in depressed park wiper systems produced by the assignee of this invention which is electrically activated to close the armature circuit but which remains mechanically latched in the activated condition, even after current in the activating coil is interrupted, until mechanically unlatched. In this circuit, motor 15 is activated through the low speed brush by means of switch apparatus 43 and park relay 71 with switch apparatus 43 in the MIST or LOW positions. The MIST mode of operation is essentially the same as the LOW speed mode, except that switch apparatus 43 includes spring means to bias movable contact 45 out of the MIST position, so that it acts like a momentary push button switch to activate a single wipe cycle.

For PULSE operation, line 60 is further connected to ground through, in series, a diode 73, a relay activating coil 75 and the parallel combination of a Darlington NPN transistor 76 and an inner wipe switch 77. The relay contacts 78 corresponding to relay activating coil 75 connect, when relay activating coil 75 is activated, lines 60 and 61. Inner wipe switch 77 is closed throughout the wipe cycle except for the inner wipe position, which is the position of the wiper at the end of the wipe pattern closest the park position, generally near the bottom of the windshield. The inner wipe position is the position in which the wiper pauses in pulse operation. A capacitor 80 (220 uF) is connected across the base-emitter terminals of transistor 76; and a resistor 81 (270) is connected from the base of transistor 76 to line 63. With switch apparatus 43 in the PULSE position, an initial wipe cycle is obtained by capacitor 80, having been charged with closure of ignition switch 41 with switch 43 in its OFF position. Discharge current from capacitor 80 turns on transistor 76 to activate relay 75, 78 and thus provide a current path from line 60 to line 61 through the armature of the activated park relay 71 to the low speed brush of motor 15. Closure of inner wipe switch 77 with the beginning of motor rotation provides continuing activation of relay 75, 78 throughout the wipe cycle, with capacitor 80 discharging to a lower voltage level through the base/collector diode of Darlington transistor 76, until the wiper reaches the inner wipe position, wherein relay 75, 78 deactivates to stop motor 15 and pause the wipers while capacitor 80 charges through resistors 81, 66 and 67 in series with the operator adjusted pause determining resistor 67. When capacitor 80 charges sufficiently to turn on transistor 76, the cycle is repeated.

To stop wiper operation from any of the above described modes, movable contact 45 is moved to its OFF position, in which it no longer contacts either of stationary contacts 46 or 47. However, park relay 71 remains mechanically latched (even from the HIGH mode to OFF, park relay 71 will have been activated and latched as movable contact 45 moved across stationary contact 47 on its way to or from the HIGH position) to provide operating current to the low speed brush of motor 15 to finish the present wipe cycle. Park relay 71 will not be mechanically unlatched and opened until the wipers are driven into their park position.

WASHER CIRCUIT AND OPERATION

The washer controlling portion of the circuit is operated through line 63. Line 63 is connected through a diode 82 and a resistor 83 (430K) to a junction 84, which junction 84 is connected through a resistor 85 (500K) to the base of a Darlington NPN transistor 86 and through a resistor 87 (500K) to the base of a Darlington NPN transistor 88. Junction 84 is further connected through a resistor 89 (430K) to ground. Transistors 86 and 88 are connected through a reversing relay arrangement to connect washer pump motor 23 for activation in either of two directions. Each of transistors 86 and 88 has a grounded emitter. Transistor 86 has a collector connected through the activating coil 95 of a relay 96 to a normally closed contact 104 of a relay 100. Transistor 88 has a collector connected through the activating coil 90 of a relay 91 to a normally open contact 103 of relay 100. Motor 23 is connected between armature contact 92 of relay 91 and armature contact 97 of relay 96. The normally closed contacts 93 and 98 of relays 91 and 96, respectively, are grounded; and the corresponding normally open contacts 94 and 99 are connected to line 60. Thus, when line 63 is sent high by closure of wash switch 65, transistors 86 and 88 are both enabled for conduction; and the one that does conduct is determined by the state of relay 100, with armature contact 102 of relay 100 connected to line 60 to provide collector current for one of transistors 86 and 88.

One end of activating coil 101 of relay 100 is connected to the collector of a grounded emitter, Darlington NPN transistor 106 having a base connected to ground through a transistor 107 (18.4K) and, through line 32, NTC thermistor 33 and line 31 in series, to the collector of a PNP transistor 108. Transistor 108 has an emitter connected to the other end of activating coil 101 in a junction 117 and a base connected through a resistor 110 (1K) to the collector of transistor 106. Another 1K resistor 111 is connected across the base/emitter junction of transistor 108. Junction 117 is connected to ground through a zener diode 112 (5.3 v) and is connected through a resistor 113 (2K) to the collector of transistor 108. Junction 117 is connected through a resistor 115 (220 ohm, ¼W) to line 60.

In operation, NTC thermistor 33 is submerged in washer fluid in reservoir 20 and thus has a resistance which varies inversely with the temperature of the washer fluid. As the temperature of the washer fluid increases, the resistance of NTC thermistor 33 decreases and the voltage at the base of transistor 106 increases until transistor 106 conducts and activates relay 100. When wash switch 65 is closed, current is thus provided through armature contact 102, normally open contact 103, activating coil 90 of relay 91 and transistor 88 to ground. Relay 91 activates to connect armature contact 92 to line 60 and thus activate motor 23 in the normally backward pump activating direction. Washer pump 22, driven by motor 23, is a standard production washer pump well known in the art which, due to its mechanical and hydraulic design, generates a predetermined outlet pressure when driven in the normal forward direction and a reduced pump outlet pressure when driven in the reverse direction with the same armature voltage applied to motor 23. Activation of relay 91 thus produces the lower pump outlet pressure. However, the low viscosity of the warm washer fluid provides the desired spray pattern through nozzle 26; and the washer fluid is deposited in a desired manner on windshield 10.

The conduction of transistor 106 turns on transistor 108 to raise the voltage across NTC thermistor 33 for hysteresis. Thus, the temperature must fall to a temperature below that which turned on transistor 106 before transistor 106 turns off and deactivates relay 100. If wash switch 65 is closed with relay 100 deactivated, current flows through armature contact 102, normally closed contact 104, activating coil 95 of relay 96 and transistor 86 to ground. Transistor 86 activates relay 96 to connect armature contact 97 to line 60 and activate motor 23 in the normal forward pump activating direction for full pump outlet pressure. With the greater viscosity of the cold washer fluid, however, the spray pattern is similar to that of the warm, lower viscosity washer fluid at the lower pressure. The system thus adjusts automatically to washer fluid temperature to maintain the desired fluid spray pattern for a desired deposition on windshield 10.

The remainder of the circuit is mostly concerned with the timing of washer operation and provision for wiper action initiated by switch 68 simultaneously with wash switch 65 to clean the washer fluid and dislodged dirt out of the wiper pattern area of windshield 10. Line 63 is connected through three series resistors 120 (510K), 121 (1.1M) and 122 (510K) to ground. A capacitor 123 (10 uF) connects the junction of resistors 120 and 121 to ground. The junction of resistors 121 and 122 is connected to the base of a Darlington NPN transistor 125 having a grounded emitter and a collector connected through a resistor 126 (270) to the junction of diode 82 and resistor 83. A capacitor 127 (3.3 uF) further connects the collector of transistor 125 to ground.

Armature contacts 92 and 97 of relays 91 and 96 are connected through diodes 130 and 131, respectively, to a junction 132, which junction 132 is connected through a capacitor 135 (15 uF) to ground and through a resistor 136 (91K) to the base of a Darlington NPN transistor 137 having a grounded emitter, a base also connected through a resistor 138 (510K) to ground and a collector connected to the collector of transistor 76.

Closure of switch 68 connects line 61, which is connected to battery 40 with switch apparatus 43 in the OFF position, to line 60 to activate the park relay 71. With lines 60 and 61 both at high voltage, wiper motor 15 is activated at low speed. The simultaneous closure of wash switch 65 causes a quick charge of capacitor 127 through the small resistor 126 and begins a slower charge of capacitor 123 through the larger resistor 120. In addition, activation of washer pump motor 23 produces a quick charge of capacitor 135 through one of relays 91 and 96, depending on which way motor 23 is activated. If the switches 65 and 68 are released immediately, capacitor 123 does not charge sufficiently to turn on transistor 125 and slowly thereafter loses whatever charge it has through resistors 121 and 122. From the moment switches 65 and 68 open, discharge of capacitor 127 times a predetermined wash time in which motor 23 is activated, with the discharge of capacitor 127 helping to maintain the full charge on capacitor 135 in spite of the fact that the opening of switch 68 has disconnected line 60 from battery 40. Washer motor 23 and wiper motor 15 continue activated during this time. When capacitor 127 discharges sufficiently to deactivate motor 23 and stop maintaining the charge on capacitor 135, capacitor 135 discharges to time a predetermined wipe period, during which wiper motor 15 remains activated, with the final wipe completed by the wiper circuit in the normal manner after capacitor 135 discharges sufficiently to turn off transistor 137.

If switches 65 and 68 are held closed long enough (typically at least one second) that capacitor 123 charges sufficiently to turn on transistor 125, transistor 125 immediately discharges capacitor 127 and changes the wash operation from a predetermined time to demand. In this case, washer pump motor 23 is activated only as long as switches 65 and 68 remain closed, with deactivation of washer pump motor 23 caused by the opening of switches 65 and 68 and the timed wiper cleaning period after wash once again determined by the discharge of capacitor 135.

The embodiments of the invention in which an exclusive property or privilege is claimed are defined as follows:

1. A window washer system for a vehicle having a window, the window washer system comprising, in combination:
   a washer fluid reservoir containing a washer fluid with a viscosity varying inversely with temperature;
   a nozzle directed at the window;
   a conduit from the reservoir to the nozzle;

a motor driven pump effective to pump washer fluid from the reservoir through the conduit and nozzle to the window, the motor driven pump having a first mode of operation in which it generates a first pump outlet pressure and a second mode of operation in which it generates a second pump outlet pressure less than the first pump outlet pressure;

a temperature sensor responsive to a temperature in the vicinity of the washer fluid reservoir so as to generate a temperature signal indicative of the temperature of washer fluid; and electric circuit means responsive to the temperature sensor to activate the motor driven pump in the first mode of operation with the temperature signal within a first temperature range and to activate the motor driven pump in the second mode of operation with the temperature signal within a second temperature range higher than the first temperature range, whereby the pump outlet pressure is automatically adjusted for the temperature dependent viscosity of the washer fluid.

2. The window washer system of claim 1 in which the temperature sensor is responsive to the temperature of the washer fluid itself.

3. The window washer system of claim 2 in which the temperature sensor has a temperature sensing element in direct contact with the washer fluid.

4. The window washer system of claim 1 in which the first and second modes of operation of the motor driven pump comprise activation of the motor driven pump in a first direction and a second direction, respectively.

5. The window washer system of claim 4 in which the motor driven pump comprises a permanent magnet DC motor having an armature and the electric circuit means comprises a source of electric power and electric switch means responsive to the temperature sensor to connect the armature alternatively in opposite directions across the source of electric power.

6. The window washer system of claim 1 in which the motor driven pump comprises an electric motor with the first and second modes of operation comprising activation of the electric motor in first and second directions and the motor driven pump further comprises hydraulic pump apparatus characterized by an asymmetry such that the pump outlet pressure varies with activation of the electric motor in opposite directions at the same motor speed.

7. The window washer system of claim 4 in which the electric motor is a two brush, permanent magnet motor with an armature and the electric circuit means comprises a source of electric power at a supply voltage and electric switch means responsive to the temperature sensor to connect the armature alternatively in opposite directions across the source of electric power at the supply voltage for substantially identical motor speeds in both directions.

8. The window washer system of claim 5 in which the temperature sensor is a thermistor and the electric circuit means comprises a transistor switching circuit in which the thermistor is included in a voltage divider to determine the conduction state of the transistor in response to temperature and the voltage across the voltage divider is adjusted in response to the conduction state of the transistor to produce hysteresis in transistor switching.

* * * * *